United States Patent [19]

Cohen et al.

[11] 4,257,937

[45] Mar. 24, 1981

[54] MODIFIED POLYESTER COMPOSITIONS

[75] Inventors: Stuart C. Cohen; Ronald L. Dieck, both of Evansville, Ind.

[73] Assignee: General Electric Company, Pittsfield, Mass.

[21] Appl. No.: 957,801

[22] Filed: Nov. 6, 1978

[51] Int. Cl.³ .................... C08L 69/00; C08L 67/02
[52] U.S. Cl. .................... 260/40 R; 525/67; 525/146; 525/148; 525/439
[58] Field of Search ............ 525/146, 148, 439, 67; 260/40 R

[56] References Cited

U.S. PATENT DOCUMENTS

| | | | |
|---|---|---|---|
| 3,474,050 | 10/1969 | Chappelear | 525/146 |
| 4,022,748 | 5/1977 | Schlichting | 260/40 R |
| 4,034,013 | 7/1977 | Lane | 260/835 |
| 4,035,333 | 7/1977 | Isamada | 525/439 |
| 4,044,073 | 8/1977 | Baron | 525/439 |
| 4,045,514 | 8/1977 | Iwahashi | 525/146 |

FOREIGN PATENT DOCUMENTS

| | | | |
|---|---|---|---|
| 49-18780 | 5/1974 | Japan | 525/148 |
| 1182807 | 3/1970 | United Kingdom | 525/148 |

*Primary Examiner*—Paul Lieberman
*Attorney, Agent, or Firm*—Morgan, Finnegan, Pine, Foley & Lee

[57] ABSTRACT

Modified thermoplastic polyester compositions are provided which comprise (a) a poly(1,4-butylene terephthalate) resin or polyester compolymer and, optionally, a poly(ethylene terephthalate) resin and (b) a modifier therefor comprising a combination of a polyacrylate resin and an aromatic polycarbonate, and, optionally (c) filler and/or reinforcing agent and/or (d) a flame retardant. Modifier (b) provides enhanced resistance to impact fracture, increased strength and improved resistance to heat distortion in articles molded from the compositions.

24 Claims, No Drawings

MODIFIED POLYESTER COMPOSITIONS

This invention relates to modified thermoplastic polyester compositions which are moldable articles of improved impact strength and thermal resistance. More particularly, the invention pertains to compositions of (a) a poly(1,4-butylene terephthalate) resin or a polyester copolymer resin and, optionally, a poly(ethylene terephthalate) resin which are modified with (b) an effective amount of a resinous combination comprising a polyacrylate and an aromatic polycarbonate and, optionally, (c) filler and/or reinforcing agent and/or (d) a flame retardant.

BACKGROUND OF THE INVENTION

High molecular weight linear polyesters and copolyesters of glycols and terephthalic or isophthalic acid have been available for a number of years. These are described inter alia in Whinfield et al, U.S. Pat. No. 2,465,319 and in Pengilly, U.S. Pat. No. 3,047,539, incorporated herein by reference. These patents disclose that the polyesters are particularly advantageous as film and fiber formers.

With the development of molecular weight control, the use of nucleating agents and two-ste molding cycles, poly (ethylene terephthalate) has become an important constituent of injection moldable compositions. Poly(1,4-butylene terephthalate), because of its very rapid crystallization from the melt, is uniquely useful as a component in such compositions. Workpieces molded from such polyester resins, alone or combined with reinforcements, in comparison with other thermoplastics, offer a high degree of surface hardness and abrasion resistance, high gloss, and lower surface friction.

Stable polyblends of poly(1,4-butylene terephthalate) and poly(ethylene terephthalate) can be molded into useful unreinforced and reinforced articles. See Fox and Wambach, U.S. Pat. No. 3,953,394, incorporated herein by reference.

Block copolyesters containing units derived from poly(1,4-butylene terephthalate) and from an aromatic-/aliphatic or aliphatic polyesters are also known. See, copending application U.S. Ser. No. 752,325, filed Dec. 20, 1976, incorporated herein by reference. Such block copolyesters are useful per se as molding resins and also in intimate combination with poly(1,4-butylene terephthalate) and/or poly(ethylene terephthalate).

It has been proposed to increase the impact strengths of polyesters by adding various modifiers. For example, Brinkmann et al in U.S. Pat. No. 3,591,659 disclose that a useful family of modifiers comprises polyalkyl acrylates, methacrylates and/or ethacrylates. Baron et al in U.S. Pat. No. 4,044,073 disclose that a useful impact modifier for such polyesters in an aromatic polycarbonate. Schlichting et al in U.S. Pat. No. 4,022,748 disclose that a rubber-elastic graft copolymer having a glass temperature below $-20°$ C. is a useful modifier. Lane, U.S. Pat. No. 4,034,013, and Farnham et al, U.S. Pat. No. 4,096,202 disclose that useful impact modifiers comprise multiple stage polymers having a rubbery first stage and a hard final stage, preferably including units derived from alkyl acrylates, especially butyl acrylates. Baron et al in U.S. Pat. No. 4,034,016 (corres. German Pat. No. 2,650,870) disclose an impact modifier combination comprising a blend of a polyurethane and an aromatic polycarbonate. Copending application Ser. No. 870,679, filed Jan. 19, 1978, discloses an impact modifier combination comprising a segmented block copolyester and an aromatic polycarbonate. All of the foregoing patents and the application are incorporated herein by reference. Filled reinforced and/or flame retardant modifications of such polyesters are also well known in the art.

It has now been discovered that such polyesters can be greatly improved in impact strength, as well as tensile strength, modulus and distortion temperature under load (DTUL) by intimately admixing therewith an impact improving modifier combination comprising a polyacrylate resin and an aromatic polycarbonate resin. As will be shown hereinafter, compositions modified with the polyacrylate, alone, on the one hand, and with the aromatic polycarbonate alone, on the other, are significantly less tough. As will also be shown, the new compositions of this invention can be reinforced, filled, reinforced and filled, and all modifications can be rendered flame-retardant.

DESCRIPTION OF THE INVENTION

According to this invention, there are provided thermoplastic compositions which are useful for molding, e.g., injection molding, compression molding, transfer molding, and the like, the compositions comprising:
(a) a polyester comprising:
  (i) a poly(1,4-butylene terephthalate) resin;
  (ii) a blend of a poly(1,4-butylene terephthalate) resin and a poly(ethylene terephthalate) resin;
  (iii) a block copolyester of poly-1,4-butylene terephthalate) and an aromatic/aliphatic or aliphatic polyester;
  (iv) a blend of (iii) and a poly(ethylene terephthalate) resin; or
  (v) a blend of (iii) and a poly(1,4-butylene terephthalate) resin; and
(b) an impact modifier therefor comprising a combination of:
  (i) a polyacrylate resin; and
  (ii) an aromatic polycarbonate resin, in an amount of up to 60 parts per 100 parts by weight of (a) and (b) together.

The polyester resins (a) of the compositions of this invention are available commercially or can be prepared by known techniques such as by the alcoholysis of esters of terephthalic acid with ethylene glycol or butanediol and subsequent polymerization, by heating the glycols with the free acids or with halide derivatives thereof, and similar processes. These are described in U.S. Pat. No. 2,465,319, and U.S. Pat. No. 3,047,539, and elsewhere. As has been mentioned, preparation of the block copolyesters is described in Borman, Dolce and Kramer, U.S. Ser. No. 752,325, filed Dec. 20, 1976, and incorporated herein by reference.

Illustratively, the high molecular weight polyesters will have an intrinsic viscosity of at least about 0.4 deciliters/gram and preferably, at least 0.6 deciliters/-gram as measured in a 60:40 phenol/tetrachloroethane mixture at 30° C.

Especially useful when high melt strength is important are branched high melt viscosity poly(1,4-butylene terephthalate) resins, which include a small amount of e.g., up to 5 mole percent based on the terephthalate units, of a branching component containing at least three ester forming groups. The branching component can be one which provides branching in the acid unit portion of the polyester, or in the glycol unit portion, or it can be a hybrid. Illustrative of such branching components are tri- or tetracarboxylic acids, such as trimesic acid, pyromellitic acid, and lower alkyl esters thereof, and the like, or preferably, polyols, and especially preferably, tetrols, such as pentaerythritol, triols, such as trimethylolpropane; or dihydroxy carboxylic acids and hydroxydicarboxylic acids and derivatives, such as dimethyl hydroxyterephthalate, and the like.

The branched poly(1,4-butylene terephthalate) resins and their preparation are described in Borman, U.S. Pat. No. 3,953,404, incorporated herein by reference.

Impact modifier (b) comprises a combination of (i) a polyacrylate resin and (ii) an aromatic polycarbonate. The polyacrylate resin (b)(i) can be made in known ways and they are available from a number of sources, e.g., Rohm & Haas Company, Philadelphia, U.S.A. under the trade designations Acryloid, KM330 and 7709XP. Other useful polyacrylates are available from Goodyear Tire & Rubber Co., Akron, Ohio U.S.A. under the trade designation RXL6886; from American Cyanamid Company, Stamford, Ct., U.S.A., under the trade designation Cyanacryl 770; from M & T Chemicals Co., Trenton, N.J., U.S.A., under the trade designation Durostrength 200; and from Polysar Corporation, Canada, under the trade designation Polysar S1006. In general, any of the polyalkyl acrylates described in Brinkmann et al., U.S. Pat. No. 3,591,659 can be used, especially those containing units derived from n-butyl acrylate. Preferably, the polyacrylate resin will be in the form of a rubber-elastic graft copolymer having a glass transition temperature below 20° C. as described in Schlichting et al, U.S. Pat. No. 4,022,748. Especially preferably, the polyacrylate will comprise a multiple stage polymer having a rubbery first stage and a thermoplastic hard final stage, as described in Farnham et al, U.S. Pat. No. 4,096,202, incorporated herein by reference. The polycarbonate resins (b)(ii) can be made in known ways and they are available commercially from sources, e.g., General Electric Company, Pittsfield, Mass., U.S.A., under the trademark LEXAN. In general, any of the aromatic polycarbonates described in Baron et al, U.S. Pat. No. 4,034,016 can be used, especially those including units derived from bisphenol-A.

In certain preferred features the composition will include fillers, especially reinforcing fillers such as fibrous (filamentous) glass or mineral fillers, such as clay, mica, talc and the like, preferably clay. The fillers can be untreated or treated with silane or titanate coupling agents, etc. The filamentous glass to be employed as reinforcement in such embodiments of the present compositions is well known to those skilled in the art and is widely available from a number of manufacturers. For compositions ultimately to be employed for electrical uses, it is preferred to use fibrous glass filaments comprised of lime-aluminum borosilicate glass that is relatively soda free. This is known as "E" glass. However, other glasses are useful where electrical properties are not so important, e.g., the low soda glass known as "C" glass. The filaments are made by standard processes, e.g., by steam or air blowing, flame blowing and mechanical pulling. The preferred filaments for plastic reinforcement are made by mechanical pulling. The filament diameters range from about 0.00012 to 0.00075 inch, but this is not critical to the present invention.

The length of the glass filaments and whether or not they are bundled into fibers and the fibers bundled in turn to yarns, ropes or rovings, or woven into mats, and the like, are also not critical to the invention. However, in preparing the molding compositions, it is convenient to use the filamentous glass in the form of chopped strands of from about one-eighth to about 2 inches long. In articles molded from the compositions, on the other hand, even shorter lengths will be encountered because, during compounding, considerable fragmentation will occur. This is desirable, however, because the best properties are exhibited by thermoplastic injection molded articles in which the filament lengths lie between about 0.0005 to 0.250 inch.

The amount of the filler can vary widely depending on the formulation and needs of the particular composition, it being essential only that an amount is selected which is at least sufficient to provide reinforcement. Preferably, however, the reinforcing filler will comprise from about 1 to about 60% by weight of filler (c) and (a) and (b), combined.

It has also been discovered that the polyester compositions of this invention which contain modifiers and fibrous glass exhibit improved impact and flexural properties when the glass is predispersed in the resin.

It has further been found that even relatively minor amounts of the modifier (b) are effective in providing significant improvements in impact strength, and the like. In general, however, the modifier (b) will be present in amounts of at least about 1% by weight, preferably from about 2.5 to about 50% by weight of (a) and (b). The ratio of polyacrylate to aromatic polycarbonate can vary widely, i.e., within the range of 1 to 99 parts of the former to, correspondingly, 99 to 1 parts of the latter, but in general, from 60 to 40 parts of the polyacrylate will be present for each 40 to 60 parts of the aromatic polycarbonae per 100 parts by weight of (b).

The impact modified polyesters, alone, or in combination with a filler can be rendered flame retardant with an effective amount of a conventional flame retardant agent (d). As is well known, flame retardants can be based on elementary red phosphorus, phosphorus compounds, halogen and nitrogen compounds alone or preferably in further combination with synergists, such as antimony compounds. Especially useful are polymeric and oligomeric flame retardant agents comprising tetrabromobisphenol-A carbonate units, see, for example, Wambach, U.S. Pat. No. 3,833,685, which is incorporated herein by reference.

Other ingredients, such as dyes, pigments, drip retardants, and the like can be added for their conventionally employed purposes.

The compositions of this invention can be prepared by a number of procedures. In one way, the modifier (b) and any reinforcement, e.g., glass fibers, or non-reinforcing filler or fire retardants is put into an extrusion compounder with the polyester resin base (a) to produce molding pellets. The modifier, and filler and/or reinforcement, if any, is dispersed in a matrix of the resin in the process. In another procedure, the modifier (b) is mixed with the polyester resin base (a) by dry blending, then either fluxed on a mill and comminuted, or then extruded and chopped. The modifying agent (b) can also be mixed with the polyester resin base (a) and directly molded, e.g., by injection or transfer molding techniques.

It is always important to thoroughly free all of the ingredients; polyester resin, modifier, reinforcement, filler, if used, and any optional, conventional additivies from as much water as possible.

In addition, compounding should be carried out to ensure that the residence time in the machine is short; the temperature is carefully controlled; the friction heat is utilized; and an intimate blend between the polyester resin and the modifier is obtained.

Although it is not essential, best results are obtained if the ingredients are pre-compounded, pelletized and then molded. Pre-compounding can be carried out in conventional equipment. For example, after carefully pre-drying the polyester and modifier and the reinforcing agent, or filler, if used, e.g., under vacuum at 100° C. for 12 hours, a single screw extruder is fed with a dry blend of the ingredients, the screw employed having a long transition section to ensure proper melting. On the other hand, a twin screw extrusion machine, e.g., a 28 mm Werner Pfleiderer machine can be fed with resins and additives at the feed port and reinforcement down stream. In either case, a generally suitable machine temperature will be about 450° to 460° F.

The pre-compounded composition can be extruded and cut up into molding compounds such as conventional granules, pellets, etc., by standard techniques.

The composition can be molded in any equipment conventionally used for glass-filled thermoplastic compositions, e.g., a Newbury type injection molding machine with conventional cylinder temperatures, e.g., 450°–525° F. and conventional mold temperatures, e.g., 130°–150° F.

DESCRIPTION OF THE PREFERRED EMBODIMENTS

The following examples illustrate the invention. They are set forth as a further description but are not to be construed as limiting the invention thereto.

EXAMPLES 1–12

Dry blends of poly(1,4-butylene terephthalate) resin (PBT), intrinsic viscosity 1.05 dl/g., melt viscosity 6,200 poise, acrylic rubber, aromatic polycarbonate of bisphenol-A and phosgene and mold release/stabilizer are compounded and extruded at 520° F. in an extruder. The extrudate is pelletized and injection molded at 520° F. (mold temperature 130° F.). The comparison purposes, blends are made omitting the polyacrylate on the one hand and the aromatic polycarbonate on the other. The formulations and physical properties are shown in Table 1.

TABLE 1

Compositions Comprising Polyesters, a Polyacrylate and an Aromatic Polycarbonate

| Example | A* | B* | C* | 1 | 2 | 3 | 4 |
|---|---|---|---|---|---|---|---|
| Composition (parts by weight) | | | | | | | |
| Poly(1,4-butylene terephthalate)$^a$ | 99.8 | 77.3 | 84.95 | 78.3 | 73.3 | 68.3 | 63.3 |
| Polyacrylate rubber$^{b(i)}$ | — | 22.5 | — | 10.0 | 15.0 | 15.0 | 20.0 |
| Aromatic polycarbonate$^{b(ii)}$ | — | — | 15.0 | 10.0 | 10.0 | 15.0 | 15.0 |
| Mold release/stabilizers (to make 100) | | | | | | | |
| Properties | | | | | | | |
| Heat distortion temp. °F. at 264 psi | 130 | 169 | 145 | 133 | 130 | 134 | 129 |
| Tensile strength, psi | 7500 | 7400 | 9400 | 6800 | 6200 | 6200 | 5800 |
| Modulus, psi | 340,000 | 310,000 | 350,000 | 300,000 | 270,000 | 270,000 | 250,000 |
| Notched Izod impact strength, ft.-lbs./in. ⅛" sample | 1.0 | 10.8 | 1.0 | 18.6 | 20.3 | 20.9 | 21.0 |
| Notched Izod impact strength, ft.-lbs./in. ¼" sample | 1.0 | 3.0 | 1.0 | 6.9 | 18.0 | 18.1 | 16.3 |

| Example | 5 | 6 | 7 | 8 | 9 | 10 | 11 | 12 |
|---|---|---|---|---|---|---|---|---|
| Composition (parts by weight) | | | | | | | | |
| Poly(1,4-butylene terephthalate)$^a$ | 58.3 | 74.8 | 69.8 | 69.8 | 71.1 | 67.3 | 63.6 | 56.1 |
| Polyacrylate rubber$^{b(i)}$ | 20.0 | 10.0 | 10.0 | 5.0 | 5.0 | 10.1 | 15.0 | 25.0 |
| Aromatic polycarbonate$^{b(ii)}$ | 20.0 | 15.0 | 20.0 | 20.0 | 23.7 | 22.5 | 21.2 | 18.7 |
| Mold release/stabilizers (to make 100) | | | | | | | | |
| Properties | | | | | | | | |
| Heat distortion temp. °F. at 264 psi | 136 | 159 | 145 | 140 | 169 | 169 | 170 | 150 |
| Tensile strength, psi | 5900 | 6800 | 6900 | 6900 | 7800 | 7400 | 6700 | 5800 |
| Modulus, psi | 230,000 | 290,000 | 300,000 | 305,000 | 340,000 | 320,000 | 300,000 | 250,000 |
| Notched Izod impact strength ft.-lbs./in. ⅛" sample | 20.8 | 12.4 | 4.1 | 1.6 | 1.3 | 15.4 | 18.1 | 17.8 |
| Notched Izod impact strength ft.-lbs./in. ¼" sample | 16.7 | 4.3 | 1.3 | 1.4 | 1.2 | 8.9 | 16.3 | 14.1 |

*Control
$^a$Valox 315, General Electric Co.
$^{b(i)}$Acryloid KM 330, Rohm & Haas Co., U.S. Pat. No. 4,096,202, a multiple stage polymer having a rubbery first stage and a thermoplastic hard final stage.
$^{b(ii)}$Lexan 101, General Electric Co.

It can be seen that the composition according to this invention exhibited increased notched Izod impact both at ⅛" and ¼" thicknesses. The addition of aromatic polycarbonate in combination with the polyacrylate also produced increased tensile strength, modulus and heat distortion.

EXAMPLES 13–16

The general procedure of Example 1 is used to make compositions of poly(1,4-butylene terephthalate), poly(ethylene terephthalate), polyacrylate and aromatic polycarbonate. The formulations used and the properties obtained are set forth in Table 2.

TABLE 2

Compositions Comprising Blended Polyesters, a Polyacrylate and an Aromatic Polycarbonate

| Example | 13 | 14 | 15 | 16 |
|---|---|---|---|---|
| Composition (parts by weight) | | | | |
| Poly(1,4-butylene terephthalate)[a)(i)] | 63.3 | 53.3 | 43.3 | 38.3 |
| Poly(ethylene terephthalate)[a)(ii)] | 5.0 | 15.0 | 25.0 | 30.0 |
| Polyacrylate rubber[b)(i)] | 15.0 | 15.0 | 15.0 | 15.0 |
| Aromatic Polycarbonate[b)(ii)] | 15.0 | 15.0 | 15.0 | 15.0 |
| Mold release/stabilizer, (to make 100) | | | | |
| Properties | | | | |
| Heat distortion temperature at 264 psi, °F. | 116 | 127 | 129 | 125 |
| Tensile strength, psi | 6500 | 6500 | 6600 | 6600 |
| Modulus, psi | 290,000 | 275,000 | 286,000 | 280,000 |
| Notched Izod impact strength, ft.-lbs./in. ⅛" | 20.2 | 19.6 | 19.3 | 18.2 |
| Notched Izod impact strength, ft.-lbs./in. ¼" | 5.1 | 4.7 | 4.6 | 4.6 |

[a)(i), (b)(i), (b)(ii)] -- see footnotes to Table 1
[a)(ii)] Goodyear, VF 738 A 7C, i.v. 0.62 dl./g.

EXAMPLES 17-21

The general procedure of Example 1 is used to make compositions of glass reinforced poly(1,4-butylene terephthalate), optionally, poly(ethylene terephthalate), polyacrylate and an aromatic polycarbonate. The formulations used and the properties obtained are set forth in Table 3.

TABLE 3

Glass Fiber Reinforced Compositions Comprising Polyesters, Polyacrylate and Aromatic Polycarbonate

| Example | 17 | 18 | 19 | 20 | 21 |
|---|---|---|---|---|---|
| Compositions (parts by weight) | | | | | |
| Poly(1,4-butylene terephthalate)[a)(i)] | 39.7 | 44.7 | 53.3 | 58.5 | 38.3 |
| Poly(ethylene terephthalate)[a)(ii)] | — | — | — | — | 15.0 |
| Polyacrylate rubber[b)(i)] | 15.0 | 10.0 | 15.0 | 15.0 | 15.0 |
| Aromatic polycarbonate[b)(ii)] | 15.0 | 15.0 | 15.0 | 15.0 | 15.0 |
| Fibrous glass reinforcement | 30.0 | 30.0 | 15.0 | 10.0 | 15.0 |
| Stabilizer/mold release (to make 100) | | | | | |
| Properties | | | | | |
| Heat distortion temp. at 264 psi, °F., | 329 | 348 | 252 | 220 | 238 |
| Tensile strength, psi | 14,300 | 15,000 | 10,900 | 9,800 | 11,000 |
| Modulus, psi | 850,000 | 860,000 | 460,000 | 400,000 | 490,000 |
| Notched Izod impact strength, ft.-lbs./in., ⅛" | 3.2 | 3.2 | 3.5 | 3.5 | 3.8 |
| Notched Izod impact strength, ft.-lbs./in., ¼" | N.D. | N.D. | N.D. | N.D. | N.D. |

[(a)(i), (a)(ii), (b)(i) and (b)(ii)] -- see Footnotes to Tables 1 and 2
N.D. -- not determined The compositions have especially excellent impact strength.

EXAMPLES 22-28

Mineral filled impact modified compositions are prepared by the general procedure of Example 1. The formulations and results are set forth in Table 4.

TABLE 4

Mineral Filled Compositions Comprising Polyesters, Polyacrylates and Aromatic Polycarbonates

| Example | 22 | 23 | 24 | 25 | 26 | 27 | 28 |
|---|---|---|---|---|---|---|---|
| Composition (parts by weight) | | | | | | | |
| Poly(1,4-butylene terephthalate)[a)(i)] | 58.2 | 43.2 | 28.2 | 38.0 | 46.0 | 39.8 | 47.8 |
| Poly(ethylene terephthalate)[a)(ii)] | — | 15.0 | 30.0 | — | — | — | — |
| Polyacrylate rubber[b)(i)] | 15.0 | 15.0 | 15.0 | 15.0 | 11.0 | 15.0 | 15.0 |
| Aromatic polycarbonate[b)(ii)] | 15.0 | 15.0 | 15.0 | 15.0 | 11.0 | 15.0 | 11.0 |
| Satintone clay[c)(ii)] | 10.0 | 10.0 | 10.0 | — | — | — | — |
| Translink clay[c)(ii)] | — | — | — | — | — | 30.0 | 30.0 |
| Minex 10[c)(ii)] | — | — | — | 30.0 | 30.0 | — | — |
| Stabilizer/mold release (to make 100) | | | | | | | |
| Properties | | | | | | | |
| Heat distortion temp., at 264 psi, °F. | 154 | 164 | 159 | 166 | 159 | 196 | 190 |
| Tensile strength, psi | 6700 | 6600 | 6300 | 5600 | 6200 | 6600 | 7300 |
| Modulus, psi | 315,000 | 320,000 | 320,000 | 350,000 | 400,000 | 450,000 | 500,000 |
| Notched Izod impact, | | | | | | | |

TABLE 4-continued

Mineral Filled Compositions Comprising Polyesters, Polyacrylates and Aromatic Polycarbonates

| Example | 22 | 23 | 24 | 25 | 26 | 27 | 28 |
|---|---|---|---|---|---|---|---|
| ft./lbs./in. ⅛" | 3.4 | 2.7 | 2.9 | 1.6 | 1.6 | 1.2 | 1.0 |

(a)(i), (a)(ii), (b)(i), (b)(ii) — see Footnotes to Tables 1 and 2
(c)(ii)Satintone clay, Engelhard Co., New Jersey; Translink clay, Freeport Kaolin Co., Georgia;Minex 10, Indusman Ltd., Toronto, Canada

EXAMPLES 29-33

Fire retarded, impact modified compositions are prepared by the general procedure of Example 1. The formulations and results are set forth in Table 5.

TABLE 5

Fire Retarded Compositions Comprising Polyesters, Polyacrylates and Aromatic Polycarbonates

| Examples | 29 | 30 | 31 | 32 | 33 |
|---|---|---|---|---|---|
| Composition (parts by weight) | | | | | |
| Poly(1,4-butylene terephthalate)[a] | 47.8 | 52.8 | 48.8 | 33.8 | 38.8 |
| Polyacrylate rubber[b)(i)] | 15.0 | 15.0 | 10.0 | 10.0 | 15.0 |
| Aromatic Polycarbonate[b)(ii)] | 15.0 | 10.0 | 10.0 | 10.0 | 15.0 |
| Brominated aromatic polycarbonate[d] | 19.0 | 19.0 | 26.0 | 30.0 | 26.0 |
| Flame retardant synergist, antimony oxide | 3.0 | 3.0 | 5.0 | 6.0 | 5.0 |
| Stabilizers/mold release (to make 100) | | | | | |
| Properties | | | | | |
| Heat distortion temp. at 264 psi, °F. | 159 | 155 | 208 | 196 | 230 |
| Tensile strength, psi | 7000 | 7000 | 7700 | 7900 | 7200 |
| Modulus, psi | 300,000 | 300,000 | 340,000 | 340,000 | 300,000 |
| Notched Izod impact strength, ft.-lbs./in., ⅛" | 14.8 | 10.3 | 2.6 | 2.5 | 10.7 |
| UL94 Flammability Rating, 1/16" | V-2 | V-2 | V-0 | V-0 | V-2 |
| Gardner impact strength, in.-lbs. | 480+ | 480+ | 300 | 400 | 400 |

(a), (b)(i), (b)(ii) — See footnotes to Tables 1 and 2
(d)50—50 wt. % tetrabromobisphenol-A, bisphenol-A copolycarbonate; Wambach, U.S. Pat. No. 3,833,685.

It is seen that the improved impact properties are achieved without detrimental effect on mechanical properties such as elongation and tensile strength.

EXAMPLE 34

An impact modified composition comprising a block copolyester, a polyacrylate and an aromatic polycarbonate is prepared by the general procedure of Example 1. The formulation and results are set forth in Table 6.

TABLE 6

Composition Comprising Block Copolyester, Polyacrylate and Aromatic Polycarbonate

| | Example 34 |
|---|---|
| Composition (parts by weight) | |
| Poly(1,4-butylene terephthalate)copolyester[a)(iii)] | 69.8 |
| Polyacrylate rubber[b)(i)] | 15.0 |
| Aromatic polycarbonate[b)(ii)] | 15.0 |
| Properties | |
| Heat Distortion temp. at 264 psi, °F. | 126 |
| Tensile strength, psi | 5500 |
| Modulus, psi | 235,000 |
| Notched Izod impact strength, ft.-lbs./in., ⅛" | 18.9 |
| Gardner impact strength, in. lbs. | 400 |

(a)(iii)General Electric Co., Valox 330 PBT/aromatic-aliphatic polyester.
(b)(i), (b)(ii), see Footnotes to Table 1.

Obviously, other modifications and variations of the present invention are possible in the light of the above teachings. For example, the reinforced and/or filled compositions can be rendered flame retardant, and the copolyester can be partially replaced with poly(1,4-butylene terephthalate) or poly-(ethylene terephthalate). It is therefore, to be understood that changes may be made in the particular embodiments described above which are within the scope of the invention as defined in the appended claims.

We claim:
1. A thermoplastic resin composition comprising:
   (a) a polyester resin base containing any of the following:
      (i) a poly(1,4-butylene terephthalate) resin;
      (ii) a blend of poly(1,4-butylene terephthalate) resin and a poly(ethylene terephthalate) resin:
      (iii) a block copolyester of poly(1,4-butylene terephthalate) and an aromatic/aliphatic polyester;
      (iv) a blend of (iii) and a poly(ethylene terephthalate) resin; or
      (v) a blend of (iii) and a poly(1,4-butylene terephthalate) resin; and
   (b) an impact modifier therefor comprising a combination of:
      (i) a polyacrylate resin; and
      (ii) an aromatic polycarbonate resin, in an amount of up to 60 parts per 100 parts by weight of (a) and (b) together.
2. A composition as defined in claim 1 wherein the impact modifier (b) is present in an amount of at least about 1.0 parts by weight per 100 parts by weight of (a) and (b) together.
3. A composition as defined in claim 1 wherein the modifier (b) is present in an amount of from about 2.5 to about 50 parts by weight per 100 parts by weight of (a) and (b) together.

4. A composition as defined in claim 1 wherein said polyester resin base (a) has an intrinsic viscosity of at least about 0.4 deciliters/gram when measured in a solution in a 60:40 mixture of phenol and trichloromethane at 30° C.

5. A composition as defined in claim 4 wherein said polyester resin base (a) has an intrinsic viscosity of at least about 0.6 deciliters per gram when measured in a solution in a 60:40 mixture of phenol and trichloromethane at 30° C.

6. A composition as defined in claim 1 wherein in components (a)(i), (a)(ii) and (a)(v), said poly(1,4-butylene terephthalate) resin is linear or branched.

7. A composition as defined in claim 6 wherein said branched polyester is a high melt viscosity (1,4-butylene terephthalate) resin which includes a small amount of a branching component containing at least three ester forming groups.

8. A composition as defined in claim 1 wherein said polyacrylate resin (b)(i) includes units derived from n-butyl acrylate.

9. A composition as defined in claim 1 wherein said polyacrylate resin comprises a multiple stage polymer having a rubbery first stage and a thermoplastic hard final stage.

10. A composition as defined in claim 1 wherein said aromatic polycarbonate resin includes units derived from bisphenol-A.

11. A composition as defined in claim 1 which also includes (c) a filler and/or reinforcing agent in an amount of from about 1 to about 60 parts by weight per 100 parts by weight of (a), (b) and (c) together.

12. A thermoplastic composition as defined in claim 11 wherein component (c) comprises (c)(i) fibrous glass.

13. A thermoplastic composition as defined in claim 12 wherein component (c)(i) comprises fibrous glass pre-dispersed in said polyester component (a).

14. A composition as defined in claim 1 which also includes (d) a flame-retardant amount of a flame retarding agent.

15. A composition as defined in claim 14 wherein component (d) comprises an aromatic polycarbonate containing units of tetrabromobisphenol-A and said units are present in said composition in an amount at least sufficient to render the composition flame retardant.

16. A composition as defined in claim 1 wherein component (c) comprises (ii) a mineral filler.

17. A composition as defined in claim 16 wherein component (c)(ii) comprises a clay.

18. A composition as defined in claim 1 which also includes (c) a filler and/or reinforcing agent in an amount of from about 1 to about 60 parts by weight per 100 parts by weight of (a), (b) and (c) together and (d) a flame-retardant amount of a flame retarding agent.

19. A composition as defined in claim 18 wherein component (c) comprises (i) fibrous glass.

20. A composition as defined in claim 18 wherein component (c) comprises (ii) a mineral filler.

21. A composition as defined in claim 1 wherein said polyester resin base (a) is composed predominantly of component (a)(i).

22. A composition as defined in claim 1 wherein said polyester resin base (a) is composed predominantly of component (a)(ii).

23. A composition as defined in claim 1 wherein said polyester resin base (a) is composed predominantly of component (a)(iii).

24. A thermoplastic resin composition comprising (a) a polyester resin base the majority of the mass of which has the structural configuration of poly(1,4-butylene terephthalate) and (b) an impact modifier for same comprising in combination in weight proportions between about 60/40 and about 40/60 a polyacrylate resin and an aromatic polycarbonate resin, the proportion of (b) being sufficient to improve impact strength significantly but not exceeding about 60 parts of (b) per 100 parts by weight of (a) and (b) together.

* * * * *

REEXAMINATION CERTIFICATE (443rd)

United States Patent [19]

Cohen et al.

[11] B1 4,257,937

[45] Certificate Issued Jan. 7, 1986

[54] MODIFIED POLYESTER COMPOSITIONS

[75] Inventors: Stuart C. Cohen; Ronald L. Dieck, both of Evansville, Ind.

[73] Assignee: General Electric Company, Pittsfield, Mass.

Reexamination Request:
No. 90/000,672, Nov. 23, 1984

Reexamination Certificate for:
Patent No.: 4,257,937
Issued: Mar. 24, 1981
Appl. No.: 957,801
Filed: Nov. 6, 1978

[51] Int. Cl.[4] .................. C08L 69/00; C08L 67/02; C08K 3/34
[52] U.S. Cl. .................. 524/445; 524/539; 525/67; 525/146; 525/148; 525/439
[58] Field of Search ................. 525/444; 524/605

[56] References Cited

U.S. PATENT DOCUMENTS

| | | | |
|---|---|---|---|
| 3,864,428 | 2/1975 | Nakamura et al. | 260/873 |
| 4,022,748 | 5/1977 | Schlichting et al. | 524/605 |
| 4,069,278 | 1/1978 | Borman et al. | 525/444 |
| 4,180,494 | 12/1979 | Fromuth et al. | 260/40 R |

FOREIGN PATENT DOCUMENTS

1018975 4/1974 Japan .
1440783 6/1976 United Kingdom .

*Primary Examiner*—Lewis T. Jacobs

[57] ABSTRACT

Modified thermoplastic polyester compositions are provided which comprise (a) a poly(1,4-butylene terephthalate) resin or polyester compolymer and, optionally, a poly(ethylene terephthalate) resin and (b) a modifier therefor comprising a combination of a polyacrylate resin and an aromatic polycarbonate, and, optionally (c) filler and/or reinforcing agent and/or (d) a flame retardant. Modifier (b) provides enhanced resistance to impact fracture, increased strength and improved resistance to heat distortion in articles molded from the compositions.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2, 3 and 9 are cancelled.

Claims 1 and 24 are determined to be patentable as amended.

Claims 4-8 and 10-23, dependent on an amended claim, are determined to be patentable.

New claim 25 is added and determined to be patentable.

1. A thermoplastic resin composition comprising:
 (a) a polyester resin base containing any of the following:
  (i) a poly(1,4-butylene terephthalate) resin;
  (ii) a blend of poly(1,4-butylene terephthalate) resin and a poly(ethylene terephthalate) resin;
  (iii) a block copolyester of poly(1,4-butylene terephthalate) and an aromatic/aliphatic polyester;
  (iv) a blend of (iii) and a poly(ethylene terephthalate) resin; or,
  (v) a blend of (iii) and a poly(1,4-butylene terephthalate) resin; and,
 (b) an impact modifier therefor comprising a combination of:
  (i) a polyacrylate resin *comprising a multiple stage polymer having a rubbery first stage and a thermoplastic hard final stage and present in an amount of at least 5 parts per 100 parts by weight of (a) and (b) together*; and,
  (ii) an aromatic polycarbonate resin, in an amount of *at least 10 parts and* up to 60 parts per 100 parts by weight of (a) and (b) together.

24. A thermoplastic resin composition comprising:
 (a) a polyester resin base the majority of the mass of which has the structural configuration of poly(1,4-butylene terephthalate); and,
 (b) an impact modifier for same comprising in combination in weight proportions between about 60/40 and about 40/60 a polyacrylate resin *comprising a multiple stage polymer having a rubbery first stage and a thermoplastic hard final stage* and an aromatic polycarbonate resin *present in an amount of at least 10 parts per 100 parts by weight of (a) and (b) together*, the proportion of (b) being sufficient to improve impact strength significantly but not exceeding about 60 parts of (b) per 100 parts of weight of (a) and (b) together.

*25. A composition as defined in claim 1 wherein said polyacrylate resin is present in an amount of at least 10 parts per 100 parts by weight of (a) and (b) together.*

* * * * *